United States Patent

Stevenson

[11] 4,052,810
[45] Oct. 11, 1977

[54] SNELLED HOOK HOLDER

[76] Inventor: Curtis A. Stevenson, 13229 N. 41st Place, Phoenix, Ariz. 85032

[21] Appl. No.: 715,912

[22] Filed: Aug. 19, 1976

[51] Int. Cl.² .......................................... A01K 97/06
[52] U.S. Cl. ................................................. 43/57.5 R
[58] Field of Search ............ 43/57.5 R, 57.5 A, 54.5 R

[56] References Cited
U.S. PATENT DOCUMENTS

| 909,722 | 1/1909 | West | 43/57.5 R |
|---|---|---|---|
| 2,332,036 | 10/1943 | Wilburn | 43/57.5 R |
| 2,763,083 | 9/1956 | Lenz | 43/57.5 R |
| 3,713,244 | 1/1973 | Alotta | 43/57.5 R |

OTHER PUBLICATIONS

Popular Science, July 1945, p. 226, R. P. Dierkes, "Fishhook Holders Formed from Wire and Cork".

Primary Examiner—Warner H. Camp
Attorney, Agent, or Firm—Cahill, Sutton & Thomas

[57] ABSTRACT

A snelled hook holder including a hook penetratable member for releasably receiving the point of the hook, a spacer member in the form of a bent wire and a coil spring mounted transversely of the hook penetratable member for receiving and holing the leader in tension between adjacent coils of the spring.

5 Claims, 3 Drawing Figures

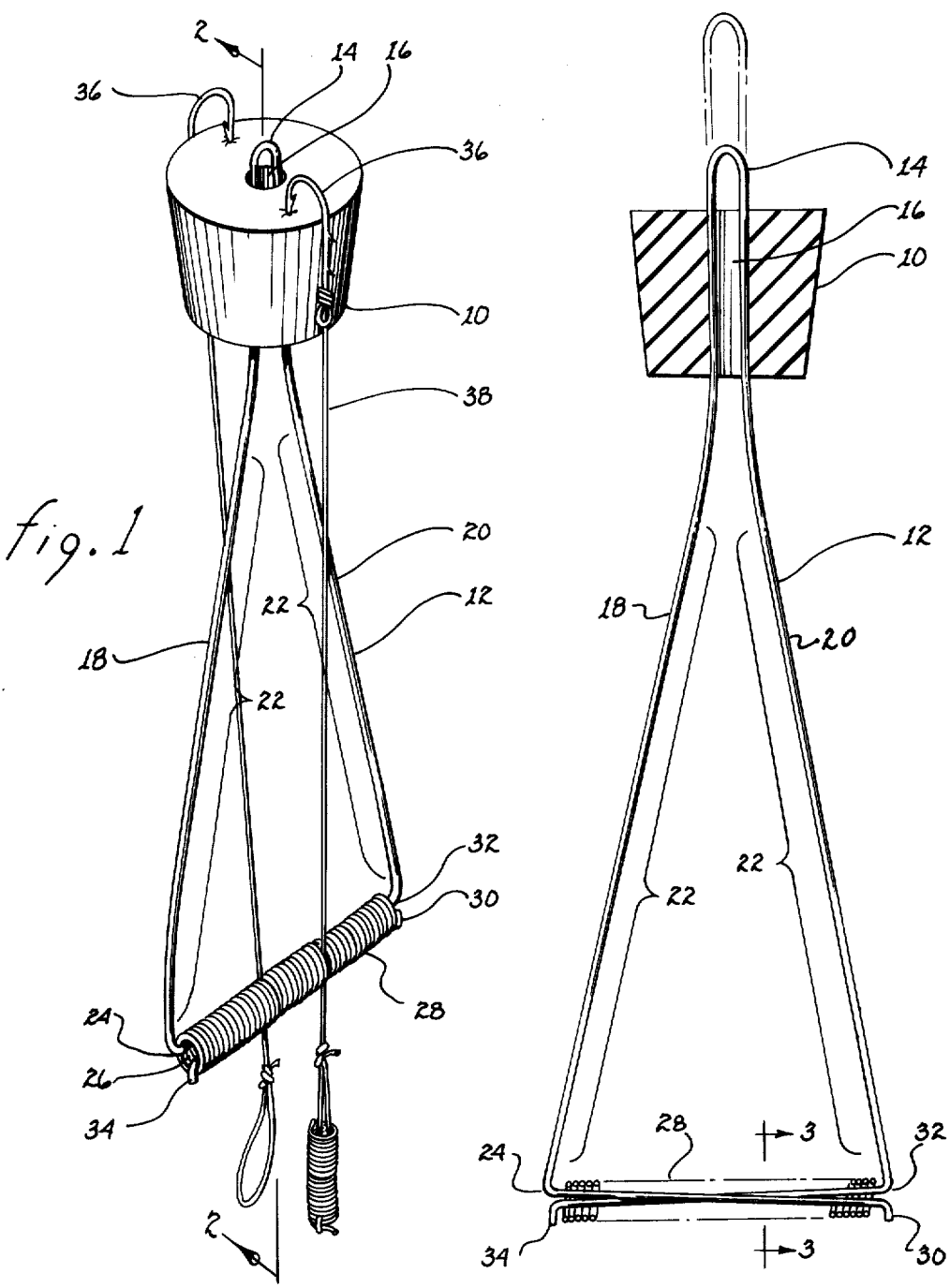

SNELLED HOOK HOLDER

BACKGROUND OF THE INVENTION

This invention relates to a device for holding or storing snelled hooks.

The storage of snelled hooks in a tackle box is a constant problem for the fisherman. The leaders become entangled with the other tackle, and disentangling the hooks when needed is an irritating problem. Moreover, since the leaders are apt to come in contact with a myriad of sharp objects during storage there is the constant threat that the leader will be frayed or damaged increasing the chances that it will break in use. Several devices have been designed to alleviate this problem. See, for example, U.S. Pat. Nos. 2,658,300; 3,172,228; 204,232; 1,957,352; 2,804,717; 742,040; 2,574,908; 2,190,647; 2,080,794; 3,713,244 and 2,659,997. In U.S. Pat. No. 2,658,300, the hook overhangs the edge of a pocket and the leader is attached by means of a terminal loop to a S-shaped hook extending from a coil spring. While this device adequately stores the snelled hook, it requires one spring for each snelled hook. U.S. Pat. No. 2,041,232 discloses a similar device. Requiring one spring for each snelled hook makes the device unnecessarily bulky whereas an object of such a device should be to conserve the limited space available in a tackle box.

The present invention accomplishes this goal by a simple, convenient, inexpensive device as will be apparent hereinafter. Basically, the device of the present invention uitlizes a single spring to accomodate a plurality of snelled hooks by inserting the leader between adjacent coils of a coiled spring. The coil spring is maintained in spaced relationship to the hook holder by a single wire which is bent to hold both the hook holder and the coil spring, the latter in a transverse configuration to the hook holder so that the space between adjacent coils is presented to the leader for insertion between adjacent coils.

BRIEF DESCRIPTION OF THE DRAWINGS

Drawings are provided wherein:

FIG. 1 is a perspective view of the snelled hook holder of the invention;

FIG. 2 is a cross-sectional view taken along line 2—2 of FIG. 1;

FIG. 3 is a cross-sectional view taken along line 3—3 of FIG. 2.

Referring to FIG. 1, the snelled hook holder includes a hook holder 10 mounted on a spacer wire 12. The spacer wire 12, preferably a piano wire, has an open-loop bent section 14 which projects through a central aperture 16 in the hook holder 10, which is preferably of rubber stock such as a conventional rubber stopper. The opposing arms 18 and 20 of wire 12 which are bent to form bent section 14 exert an outward pressure against the walls of aperture 16 to hold the hook holder 10 in place. Arms 18 and 20 flare outwardly from bent section 14 and extend downwardly forming an elongated intermediate section 22. Angularly extending from arm 18 is a leg section 24 which passes through the central channel 26 of coil spring 28. Leg section 24 has a terminal bend 30 which catches the outer end of coil spring 28 to maintain leg 25 in place. Likewise, arm 20 has a leg section 32 which passes through channel 26 of coil spring 28 in a direction opposite to leg section 24. Leg section 32 also has a terminal bend 34 for the same purpose as bend 30.

The point of hook 36 is embedded in the soft, penetrable surface of hook holder 10. Extending from the eye of hook 36 is a leader 38 which is inserted between adjacent coils of coil spring 28. Due to the urging of adjacent coils against each other, leader 38 is held tightly between adjacent coils. Another hook 36 with associated leader 38 is also shown being held in place, with the leader 38 being inserted between adjacent coils on the opposite side of the coil spring 28.

To insert the leader 38 between adjacent coils it is only necessary to press the leader 38 against a junction of adjacent coils to spread the coils allowing entry of the leader 38. To remove the leader 38, the leader 38 need simply be pulled backwards to part adjacent coils allowing the leader 38 to pass between the coils. The tension exerted by adjacent coils maintains the leader in place during storage and maintains the length of the leader in a straight line under a slight degree of tension to avoid kinking of the leader.

FIGS. 2 and 3 illustrate the manner in which leg sections 24 and 32 extend through the central channel 26 of the coil spring 28. It can be seen that the leg sections 24 and 32 angle downwardly to a slight degree as they pass through the channel 26. The terminal bends 30 and 34 maintain their associated legs in channel 26.

As can be appreciated from the foregoing description, the snelled hook holder of the present invention is simple in construction and allows numerous snelled hooks to be stored on a single device utilizing a single spring. Mounting and release of the snelled hooks is easy and convenient. The invention has been described with respect to a preferred embodiment with the understanding that many modifications may be made without departing from the spirit and scope of the invention.

What is claimed is:

1. A device for releasably holding snelled fish hooks, each fish hook having a leader extending therefrom, said device comprising in combination:

a. a hook holder means for releasably receiving the point of each fish hook;
   b. coil spring means for compressively engaging the leader of each hook attached to said hook holder means intermediate adjacent coils of said coil spring means, said coil spring means including a longitudinally extending internal channel;
   c. a spacer member for maintaining said coil spring means in spaced relationship to said hook holder means, said spacer member comprising:
      i. first and second arm means extending from said hook holder means;
      ii. first leg means extending from said first arm means in a first direction through said channel of said coil spring means and second leg means extending from said second arm means in a second direction through said channel of said coil spring means, whereby, said first and second leg means longitudinal segregate said coil spring means into halves and permit insertion of different leaders from opposed sides of said coil spring means and intermediate the same adjacent coils without having the leaders tangle with one another; and
      iii. first bend means extending from said first leg means for engaging one end of said coil spring means and second bend means extending from said second leg means for engaging another end of said coil spring means, whereby, said coil spring is maintained upon said first and second leg means intermediate said first and second bend means.

2. The device of claim 1 wherein said hook holder means comprises a rubber member having an aperture, and said spacer member comprises a terminal section insertable in said aperture for mounting said hook holder means on said spacer member.

3. The device as set forth in claim 1 wherein the distance along each said first and second leg means is greater than the length of said coil spring means for accommodating expansion at said coil spring means as a result of multiple retained leaders.

4. The device as set forth in claim 3 wherein said first arm means, said first leg means and said first bend means comprise a common first length of wire and said second arm means, said second leg means and said second bend means are comprised of a common second length of wire.

5. The device as set forth in claim 4 wherein said first and second lengths of wire are parts of the same length of wire.

* * * * *